(12) United States Patent
Dutta

(10) Patent No.: US 12,542,694 B2
(45) Date of Patent: Feb. 3, 2026

(54) NETWORK ELEMENTS, COMPUTER-READABLE STORAGE MEDIUMS AND METHODS OF UPDATING FORWARDING INFORMATION BASE IN NETWORK ELEMENTS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 231 days.

(21) Appl. No.: 17/590,612

(22) Filed: Feb. 1, 2022

(65) Prior Publication Data

US 2023/0246880 A1  Aug. 3, 2023

(51) Int. Cl.
*H04L 12/46* (2006.01)
*H04L 45/02* (2022.01)
*H04L 45/74* (2022.01)
*H04L 69/22* (2022.01)

(52) U.S. Cl.
CPC .......... *H04L 12/4645* (2013.01); *H04L 45/02* (2013.01); *H04L 45/74* (2013.01); *H04L 69/22* (2013.01); *H04L 2212/00* (2013.01)

(58) Field of Classification Search
USPC .......................................................... 370/392
See application file for complete search history.

(56) References Cited

U.S. PATENT DOCUMENTS

| 6,947,384 B2 * | 9/2005 | Bare | ........................ H04L 45/48 370/396 |
| 7,839,800 B2 | 11/2010 | Finn et al. | |
| 2009/0190504 A1 * | 7/2009 | Finn | .................... H04L 12/4687 370/254 |

(Continued)

FOREIGN PATENT DOCUMENTS

EP          3771163 A1     1/2021

OTHER PUBLICATIONS

European Search Report dated Jun. 6, 2023 for European Application No. 23153073.4.

(Continued)

*Primary Examiner* — Ayman A Abaza
*Assistant Examiner* — Hooman Houshmand
(74) *Attorney, Agent, or Firm* — Harness, Dickey & Pierce, P.L.C

(57) ABSTRACT

A network element includes processing circuitry configured to cause the network element to determine whether a received information packet is a special packet based on whether a domain header of the received information packet includes a domain configuration group (DCG) address for a domain type of the network element in a destination address field of the domain header, the DCG address being indicative of an add command or a delete command, extract an identifier of a network domain from the domain header of the received information packet in response to determining that the received information packet is a special packet, and modify a forward information base at the network element based on the DCG address and the identifier of the network.

18 Claims, 13 Drawing Sheets

(56) References Cited

U.S. PATENT DOCUMENTS

| | | | | |
|---|---|---|---|---|
| 2010/0215042 | A1* | 8/2010 | Sato | H04L 12/413 |
| | | | | 370/392 |
| 2011/0261825 | A1* | 10/2011 | Ichino | H04L 45/38 |
| | | | | 370/400 |
| 2011/0320574 | A1* | 12/2011 | Felts | G06F 9/44505 |
| | | | | 709/220 |
| 2012/0147888 | A1* | 6/2012 | Lu | H04L 45/54 |
| | | | | 370/392 |
| 2017/0250904 | A1* | 8/2017 | Singarayan | H04L 12/4641 |
| 2017/0324660 | A1* | 11/2017 | Sinha | H04L 67/10 |
| 2021/0029026 | A1* | 1/2021 | Deshmukh | H04L 45/34 |

OTHER PUBLICATIONS

"IEEE Std 802.1D—MAC bridges," IEEE, 1998.
"IEEE Std 802.1w—Rapid Reconfiguration of Spanning Tree" IEEE, 2001.
"IEEE 802.1s—Multiple Spanning Trees," IEEE, May 12, 2009.
"IEEE 802.1ad,—Provider Bridges," IEEE, 2005.
"IEEE 802.1ah—Provider Backbone Bridges" IEEE, 2009.
"IEEE 802 Numbers Registry in IANA", IEEE, last updated on Jan. 31, 2022.
"802.1ak—Multiple Registration Protocol", IEEE, Nov. 14, 2008.
Huawei Technologies Co., Ltd., "Multiple Registration Protocol", retrieved on Jan. 31, 2022.
"802.1qbe—Multiple I-SID Registration Protocol", IEEE, 2011.

\* cited by examiner

NETWORK ELEMENTS, COMPUTER-READABLE STORAGE MEDIUMS AND METHODS OF UPDATING FORWARDING INFORMATION BASE IN NETWORK ELEMENTS

BACKGROUND

Devices in networks route data packets from one device to another. Often, devices are added or deleted from the network. When this occurs, routing information for routing the data packets in the network may be added to, or deleted from, devices in the network.

SUMMARY

The scope of protection sought for various example embodiments of the disclosure is set out by the independent claims. The example embodiments and/or features, if any, described in this specification that do not fall under the scope of the independent claims are to be interpreted as examples useful for understanding various embodiments.

One or more example embodiments may improve routing performance of the network and/or reduce processing requirements for network elements. One or more example embodiments may use novel hardware and/or novel methods of generating, organizing, and/or processing commands to update a forwarding information base (FIB).

One or more example embodiments provide a network element including processing circuitry configured to cause the network element to determine whether a received information packet is a special packet based on a domain header of the received information packet, extract a first value from the domain header of the received information packet in response to determining that the received information packet is a special packet, and modify a forward information base at the network element based on the domain header and the first value.

One or more example embodiments provide a network element including means for determining whether a received information packet is a special packet based on a domain header of the received information packet, means for extracting a first value from the domain header of the received information packet in response to determining that the received information packet is a special packet, and means for modifying a forward information base at the network element based on the domain header and the first value.

At least one example embodiment provides a network element wherein the first value is an identifier of a domain.

At least one example embodiment provides a network element wherein the domain header includes a destination address field, and the processing circuitry is configured to determine whether the received information packet is a special packet based on whether the destination address field includes a value indicative of a command for modifying the forwarding information base.

At least one example embodiment provides a network element wherein the command for modifying the forwarding information base is an add command or a delete command.

At least one example embodiment provides a network element wherein the value indicative of the command is a domain configuration group (DCG) address.

At least one example embodiment provides a network element wherein the processing circuitry is configured to cause the network element to extract the first value from a domain encapsulation of the domain header of the received information packet.

At least one example embodiment provides a network element wherein the processing circuitry is configured to cause the network element to determine whether the received information packet is the special packet based on whether the domain header includes a value indicative of an add command or delete command in a destination address field.

At least one example embodiment provides a network element wherein the domain header includes a plurality of hierarchy domain encapsulation fields, each of the plurality of hierarchy domain encapsulation fields corresponding to a level of a network, and the processing circuitry is configured to cause the network element to determine whether the network element is in a highest level of the network based on the hierarchy domain encapsulation fields included in the domain header, and determine that the received information packet is the special packet in response to determining that the network element is in the highest level of the network.

At least one example embodiment provides a network element wherein the processing circuitry is configured to cause the network element to forward the received information packet in a network.

At least one example embodiment provides a network element wherein the domain header is an ethernet header including a payload field, the payload field does not include a payload in the payload field, and the received information packet includes an ethertype field in the ethernet header, the ethertype field indicating absence of the payload.

One or more example embodiments provide a method including determining, at a network element, whether a received information packet is a special packet based on a domain header of the received information packet, extracting a first value from the domain header of the received information packet in response to determining that the received information packet is a special packet, and modifying a forward information base at the network element based on the domain header and the first value.

One or more example embodiments provide a non-transitory and/or tangible computer-readable storage medium storing computer-executable instructions that, when executed by at least one processor at a network device, cause the network device to perform a method including determining, at a network element, whether a received information packet is a special packet based on a domain header of the received information packet, extracting a first value from the domain header of the received information packet in response to determining that the received information packet is a special packet, and modifying a forward information base at the network element based on the domain header and the first value.

At least one example embodiment provides a method wherein the first value is an identifier of a domain.

At least one example embodiment provides a method wherein the domain header includes a destination address field, and the determining determines whether the received information packet is a special packet based on whether the destination address field includes a value indicative of a command for modifying the forwarding information base.

At least one example embodiment provides a method wherein the command for modifying the forwarding information base is an add command or a delete command.

At least one example embodiment provides a method wherein the value indicative of the command is a domain configuration group (DCG) address.

At least one example embodiment provides a method wherein the extracting extracts the first value from a domain encapsulation of the domain header of the received information packet.

At least one example embodiment provides a method wherein the determining determines whether the received information packet is the special packet based on whether the domain header includes a value indicative of an add command or delete command in a destination address field.

At least one example embodiment provides a method wherein the domain header includes a plurality of hierarchy domain encapsulation fields, each of the plurality of hierarchy domain encapsulation fields corresponding to a level of a network, and the determining includes deciding whether the network element is in a highest level of the network based on the hierarchy domain encapsulation fields included in the domain header, and determining that the received information packet is the special packet in response to deciding that the network element is in the highest level of the network.

At least one example embodiment provides a method further including forwarding the received information packet in a network.

One or more example embodiments provide a network element including processing circuitry configured to cause the network element to obtain an identifier of a network element of a network, generate an information packet with a header having a destination address field and a domain encapsulation, the domain encapsulation including a first value and the destination address field including a value indicative of a command for modifying a forward information base at another network element based on the first value, and send the information packet over the network.

One or more example embodiments provide a network element including means for obtaining an identifier of a network element of a network, means for generating an information packet with a header having a destination address field and a domain encapsulation, the domain encapsulation including a first value and the destination address field including a value indicative of a command for modifying a forward information base at another network element based on the first value, and means for sending the information packet over the network.

One or more example embodiments provide a method including obtaining an identifier of a network element of a network, generating an information packet with a header having a destination address field and a domain encapsulation, the domain encapsulation including a first value and the destination address field including a value indicative of a command for modifying a forward information base at another network element based on the first value, and sending the information packet over the network.

One or more example embodiments provide a non-transitory and/or tangible computer-readable storage medium storing computer-executable instructions that, when executed by at least one processor at a network device, cause the network device to perform a method including obtaining an identifier of a network element of a network, generating an information packet with a header having a destination address field and a domain encapsulation, the domain encapsulation including a first value and the destination address field including a value indicative of a command for modifying a forward information base at another network element based on the first value, and sending the information packet over the network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
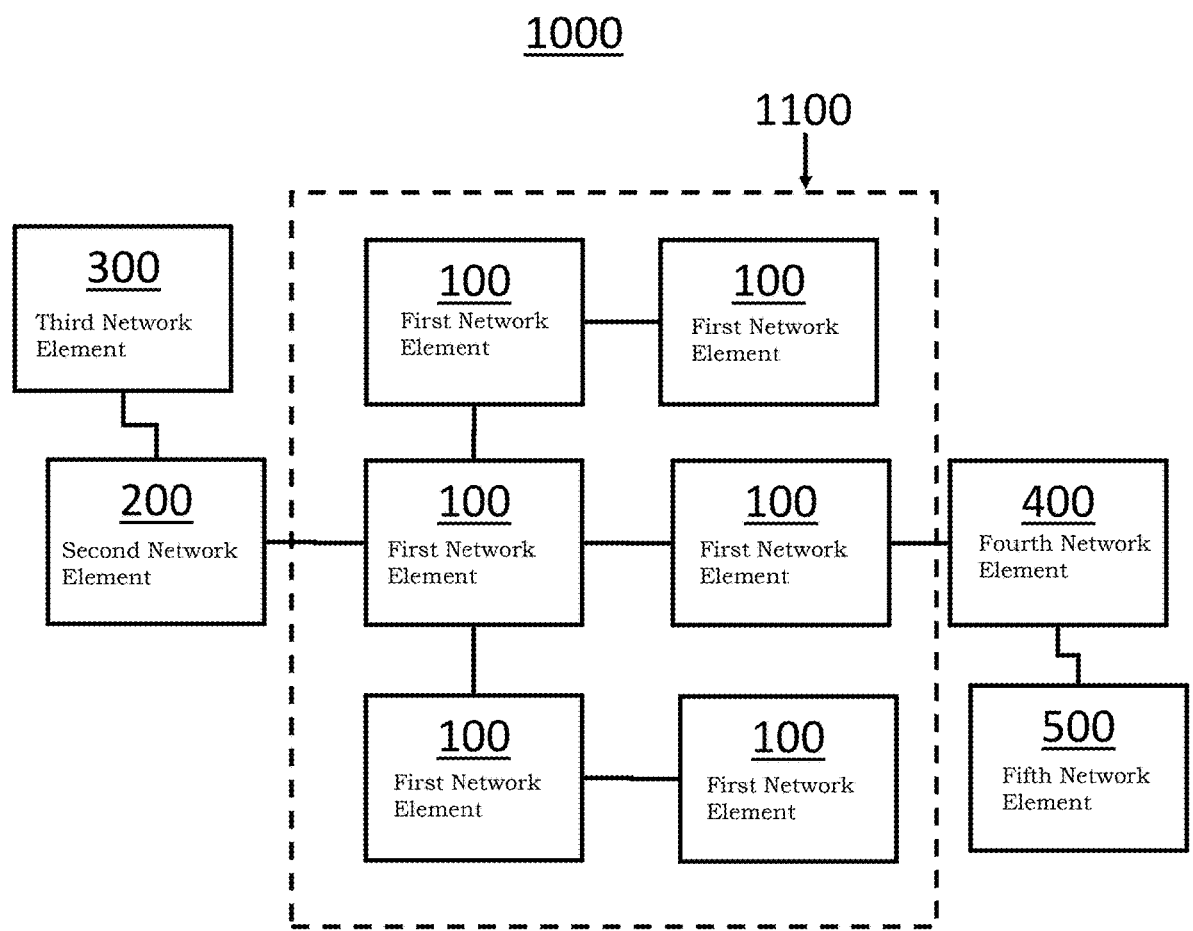
FIG. 1 is a block diagram illustrating a network according to some example embodiments.

It should be noted that these figures are intended to illustrate the general characteristics of methods, structure, and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

As mentioned above, devices in networks route data packets from one device to another. Often, several communication routes and communication methods are available for routing the information packets to their desired destinations in the network.

When a device is added to a network, each of the network devices may be sent a data packet with a command to add an indicator of the new device to a stored forwarding information base (FIB). Conventionally, after receiving the data packet with the new information for the FIB, the network elements perform a relatively significant amount of processing in the data plane before updating the FIB. This process uses valuable processing resources of the network element.

FIG. 1 is a block diagram illustrating a network 1000 according to some example embodiments. The network 1000 may include various network layers and various network elements. For example, the network 1000 may include a first network layer 1100 including first network elements 100. The network 1000 may also include a second network element 200, a third network element 300, a fourth network element 400, and a fifth network element 500.

The first network elements 100 may be forwarding devices that transfer data packets through the first network layer 1100. The first network elements 100 may receive data packets from the second network element 200 and may send data packets to the fourth network element 400. The third network element 300 may generate data packets and transfer the data packets to the second network element 200. The fifth network element 500 may receive data packets from the fourth network element 400. The third network element 300 and the fifth network element 500 may be servers, computers, smart phones, or other electronic devices. The second network element 200 and the fourth network element 400 may be routers or other hardware devices that interface between the first network layer 1100 and the third network element 300 and the fifth network element 500, respectively. Although only one second network element 200, one third network element 300, one fourth network element 400 and one fifth network element 500 are shown in FIG. 1, example embodiments should not be limited to this example.

In one example, a data packet may be sent from the third (source) network element 300 to the fifth (destination) network element 500 via the network 1000. In more detail, the data packet may be generated at the third network element 300 (the source having a source address) and sent to the second network element 200. The second network element 200 may send the data packet to one or more of the first network elements 100 in the first network layer 1100 based on the data packet header (as will be described in greater detail below). The one or more first network elements 100 may route/forward the data packet to another first network element 100 in the first electronic data layer based on the destination address and the information stored in the FIB of the first network element 100.

Each first network element 100 may include an FIB. The FIB includes instructions for pathways through which the data packet can be sent to arrive at the destination address. The FIB of each network element may include an identifier of a different first network element 100 to which the packet is to be forwarded and a port of the first network element 100 through which the data packet is to be sent for the destination address. Eventually, one of the first network elements will be communicatively connected to the fourth network element 400 and the FIB of that first network element 100 will include the fourth network element 400 and a port for the data packet to be sent through to arrive at the fourth network element 400. The fourth network element 400 may then forward the data packet to the fifth network element 500 (the destination having a destination address).

Routing techniques similar to those described above may be used with networks having multiple network layers. In such networks, data packets may be sent through a network to a lower most layer of the network (e.g., first network layer 1100 in FIG. 1) and then forwarded in the lower most layer using the instructions in the FIB until the data packet is forwarded out of the lowermost layer to the next layer of the network and the next layer until the data packet eventually arrives at the destination.

In order to accomplish this type of forwarding each device in the lowermost network may have an FIB with every known destination address, and a device and port, through which to send a data packet for the data packet to arrive at the intended destination address. The upper layers of the network (layers above than the lowermost layer) need not have all of the destination addresses because they may forward the data packet to the lowermost layer based on the header of the data packet independent of the destination address. For other layers of the network, the destination address may be stored if the device is in the (e.g., direct) communication line between the third network element 300 or the fifth network element 500 and the lowermost layer of the network. In the example of FIG. 1, this means that the second network element 200 need not store information regarding the fifth network element 500 because the second network element already knows to forward the packet to the lowermost layer of the network 1000 based on the header of the data packet. Similarly, the fourth network element 400 need not have information stored for the address of the third network element 300 because the fourth network element 400 already knows to forward the data packet to the lowermost network layer from the header of the data packet. However, within the lowermost layer of the network 1000 the direction or route for sending the data packet based on the address may be known for each address so the data packet can be sent through the correct route.

Accordingly, for a newly added device in the network, the address of the device is (e.g., need only be) mapped in a direct path to the lowermost layer of the network and throughout the lowermost layer of the network. In the example network 1000 of FIG. 1, the address of the first network element 100 could be stored in the FIB (along with a port for sending the data packets) of the second network element 200 because it is the device that directly connects the third network element 300 to the first network layer 1100. The address of the third network element 300 may also be stored in the FIB (along with a device to send the data packet to and port for the data packet to be sent through) of each of the first network elements 100 in the first network layer 1100.

As will be described in greater detail below, when a network element is added to the network 1000, a special data packet may be sent from the new network element through other devices to the lowermost layer of the network 1000 and throughout the lowermost layer of the network. For example, if the third network element 300 is added as a new device in the network 1000, the third network element 300 may send a special data packet to the second network element 200. Based on the special data packet, the second network element 200 may store the address of the third network element 300 and a port through which the second network element 200 may communicate with the third network element 300. The second network element 200 may then forward the special data packet to the lowermost layer of the network 1000 (e.g., forward the special data packet to one of the first network elements 100 in the first network layer 1100).

Based on the reception of the special data packet, the first network element 100 may store the address of the third network element 300 along with a port and identifier of the second network element 200 and send the special data packet to other first network elements in the first network layer 1100. For example, a protocol for forwarding special data packets may be programmed into the FIB of the first network elements 100 such that the first network elements 100 may forward the special data packets to each of the other first network elements 100 in the first network layer 1100. For example, communication paths may be programmed into the FIBs of the first network elements 100 that cause the first network elements 100 to forward the special data packets to each first network element 100 (e.g., only) once (e.g., the connections between the first network elements 100 shown in FIG. 1).

Once all of the first network elements 100 and the second network element 200 have been programmed based on the special data packet the network 1000 is configured to send data packets to the third network element 300. Any device outside of the lower most layer of the network need not be specifically programmed for communications with the third network element 300 because the device can send the data packet to the lowermost layer of the network 1000 and the first network elements 100 are already programmed to forward the data packet to the third network element 300.

Figure 2:
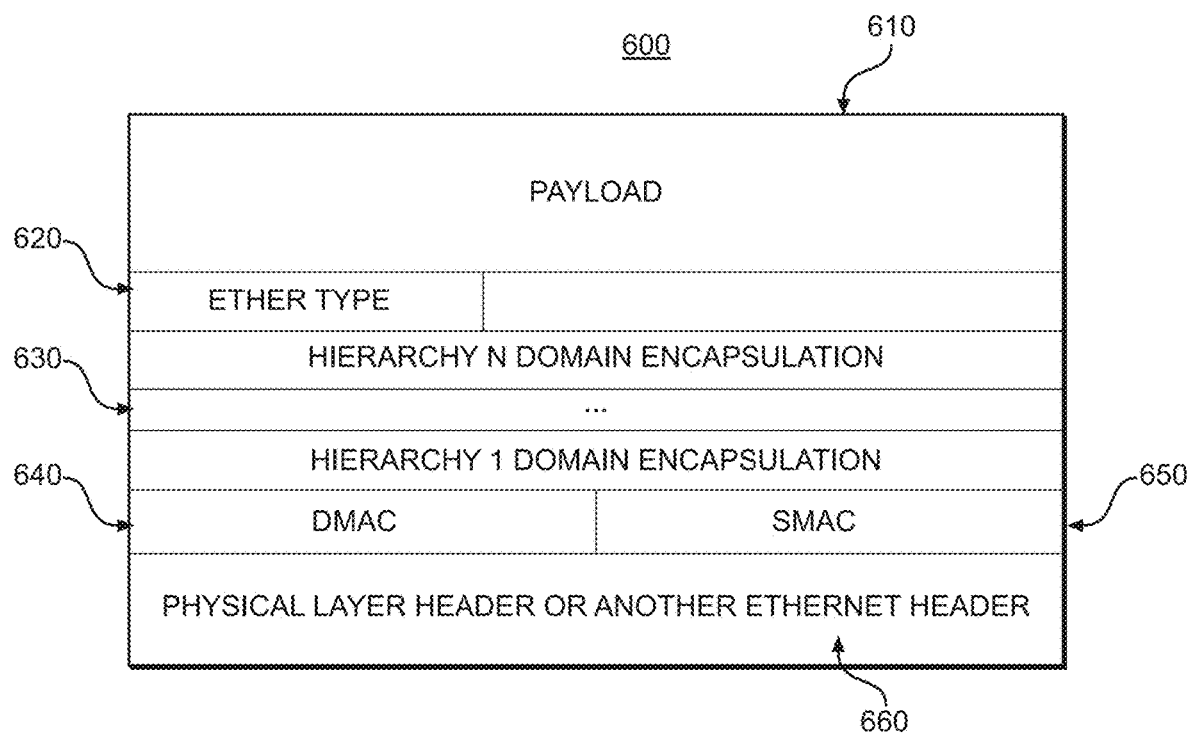
FIG. 2 is a block diagram illustrating a data packet according to some example embodiments.

FIG. 2 is a block diagram illustrating a data packet (also referred to as a packet or information packet) 600 according to some example embodiments. As discussed herein with regard to data packets, the terms "slot" and "field" may be used interchangeably.

Referring to FIG. 2, the data packet may include a payload field 610, an indication of ethertype 620, network hierarchy domain encapsulations (network hierarchy domain encapsulation fields) 630, destination media access control address (DMAC) (or destination address or destination address field) 640, source media access control address (SMAC) (or source address or source address field) 650, and physical layer header or other ethernet header 660. For a normal (e.g., non-special) data packet, the payload field 610 may include information for the destination device (e.g., device associated with the destination address). However, when the data packet is a special data packet according to one or more example embodiments, the payload is omitted from the payload field 610 in the special data packet (e.g., the payload field 610 is empty). For a normal data packet, the ethertype 620 may indicate a communication type or type of information in the payload, whereas for a special data packet according to example embodiments the ethertype 620 indicates the absence of a payload. For example, a value of '0' in the ethertype 620 may be used to indicate no payload. The hierarchy domain encapsulations 630 may indicate network layers through which the data packet is to be sent. For example, a network with N layers may have N domain encapsulations in the hierarchy domain encapsulations 630, one for each layer.

For a normal (non-special) data packet, the destination address 640 may be a device address. However, for a special data packet according to example embodiments, the destination address is a command or an address indicative of a command rather than a device address. For example, the destination address 640 may include, or be indicative of, an add network domain configuration or delete network domain configuration command as the destination slot in the destination address 640. In a more specific example, the destination address may include a domain configuration group (DCG) address indicative of a command such as add or delete a value in the FIB of the network element.

For a normal data packet, the source address 650 may be an address or other indicator of the source device. For a special data packet according to example embodiments, however, the source address may be the address to be added to or deleted from the FIB of the network element receiving the data packet.

The physical layer header or other ethernet header 660 may indicate a physical layer link by which the data packet is transported or other information included in the data packet header. The data packet 600 may include multiple source slots for different hierarchy domain encapsulations. For example, a source slot may exist for a virtual local area network (VLAN) virtual identification value.

A network element may determine that a data packet is a special data packet (e.g., a data packet with a special header), also referred to as a special packet, if the data packet includes a command for adding or deleting a first value to the FIB of the receiving network element in the destination address 640, and the command is for a domain type of the network element in the network 1000. The value that is to be added or deleted from the FIB of the network element may be a domain value of one of the domain encapsulations 630. The value to be taken from the domain encapsulation would be particular to the command. A special data packet need not include a payload at least because the necessary information is included in the packet header if the network element is programmed to receive commands in this way. When a special packet is received by a network element, the domain value triggers configuration of the specified domain in the FIB. After the specified domain is configured, the node may learn/add the source MAC address into the FIB in the context of the specified domain as part of standard ethernet forwarding procedures.

Figure 3:
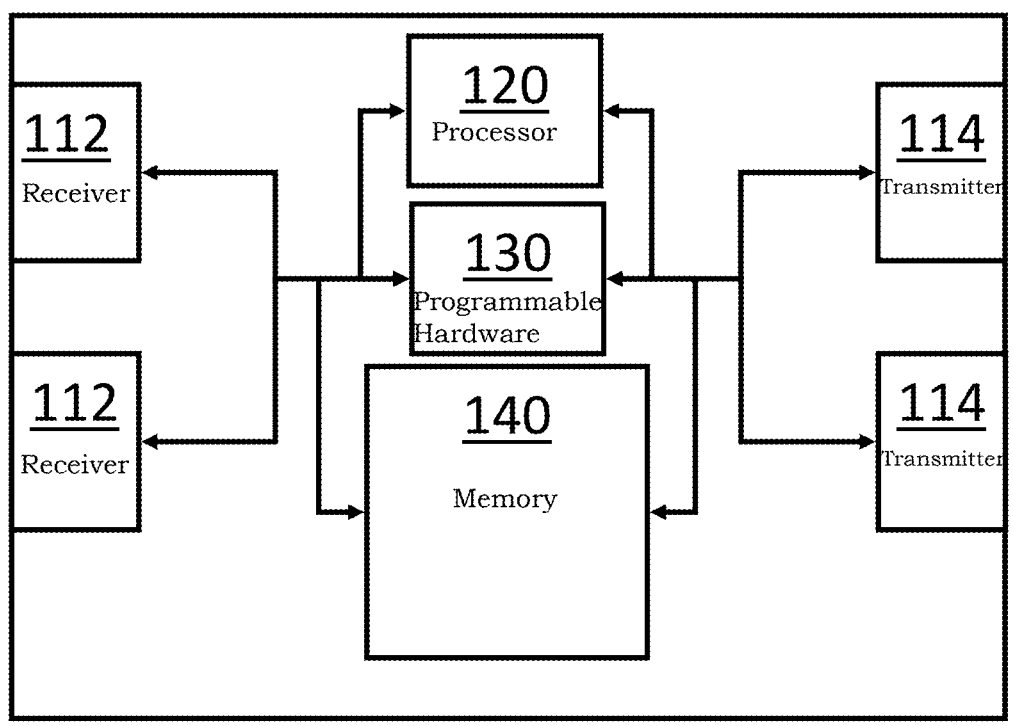
FIG. 3 is a block diagram illustrating a network element according to some example embodiments.

FIG. 3 is a block diagram illustrating a first network element 100 according to some example embodiments. The first network element 100 may include one or more receivers 112, one or more transmitters 114, one or more processors 120, programmable hardware 130, and memory 140. The processor 120 and the programmable hardware 130 may be individually or collectively referred to as processing circuitry. The memory 140 may be configured to store (i) information and instructions including instructions which the processor 120 may use to perform various operations, (ii) the FIB, and (iii) the information regarding the first network element 100, the network 1000 and the location or role of the first network element 100 in the network 1000.

A receiver 112 and transmitter 114 together may be considered a transceiver and may function as one or more ports (input/receiving and output/transmitting ports) for the first network element 100. Each of the ports may be communicatively connected to one or more network elements. The first network element 100 may communicate with other network elements (e.g., second network elements 200, fourth network elements 400, and other first network elements 100). The different ports of the first network element 100 may be configured for communication with the other network elements through different communication methods including wired or wireless local area networks, fiber optics, ethernet, Fifth Generation (5G) wireless networks, or the like. The first network element 100 may be connected for electronic communication with the other network elements through one of the communication methods. In one example, the memory 140 may be a non-transitory computer readable medium storing computer-executable instructions that, when executed by a processor, cause the processor to perform the operations disclosed as performed by the first network element 100.

The receivers 112 and transmitters 114 may be hardware for communicating with other network elements over the communication methods discussed above. The processor 120 may include one or more processing hardware such as central computing unit, arithmetic logic unit, controllers, etc. The programmable hardware 130 may include FPGAs and/or other programmable processing hardware. The memory 140 may include volatile and non-volatile memory.

The second network element 200, third network element 300, fourth network element 400, and fifth network element 500 may include the same or similar components as the first network element 100.

Figure 4:
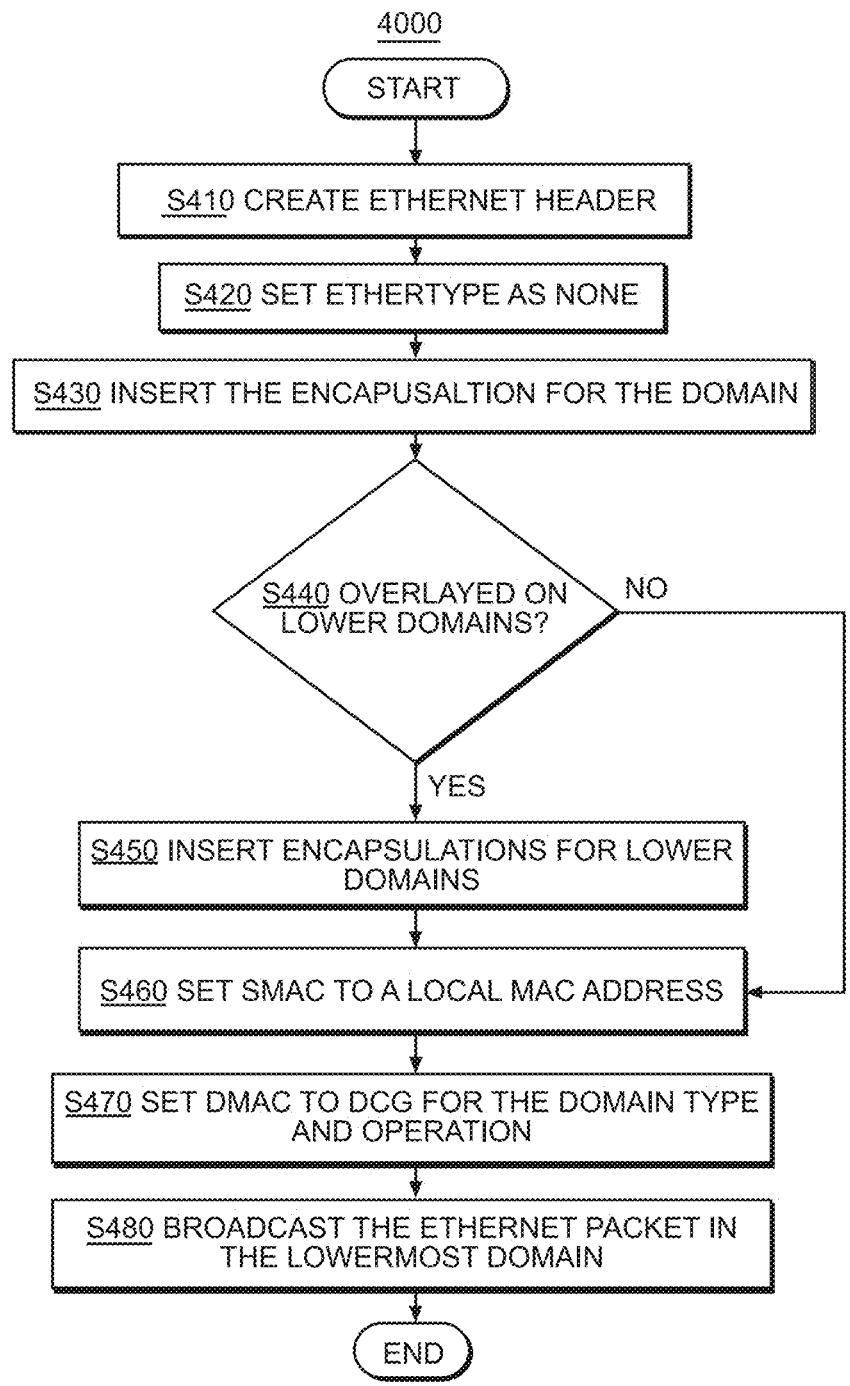
FIG. 4 is a flow chart illustrating a method according to some example embodiments.

FIG. 4 is a flow chart 4000 illustrating a method for generating and transmitting an ethernet packet according to some example embodiments. The method shown in FIG. 4 will be discussed with regard to the third network element 300. However, example embodiments should not be limited to this example. Rather, other network element may perform the method discussed herein. Although discussed as performed by the third network element 300 in most instances, it should be understood that the operations of the method shown in FIG. 4 may be performed by components (e.g., transceivers, processing circuitry, etc.) of the third network element 300.

Referring to FIG. 4, at S410 the third network element 300 creates an ethernet header for a special data packet. The third network element 300 may create the ethernet header in any suitable manner.

At S420, the third network element 300 sets the ethertype 620 of the domain header as none or '0', or another designated value, to indicate no payload is included.

At S430, the third network element 300 inserts encapsulation for the domain of the third network element 300 in the hierarchy domain encapsulation 630.

At S440, the third network element 300 determines whether the domain is overlaid on a lower domain.

If the third network element 300 determines that the domain is overlaid on a lower domain (e.g., if a client-side virtual local area network (C-VLAN) is overlaid on a single provider layer virtual local area network (S-VLAN)), then at S450 the third network element 300 inserts encapsulations for lower domains of the network 1000. The information for the encapsulation for the domain and the lower domains may be stored in a memory of the third network element 300 and may be based on a network configuration of the network 1000. The information for the encapsulation for the domain may be obtained at a point when the third network element 300 is connected to the network 1000 or sometime thereafter.

At S460, the third network element 300 sets the source address as a local MAC address for the third network element 300.

At S470, the third network element 300 sets the destination address to a command or an address indicative of a command (e.g., add or delete) and a domain type. As discussed above, in one example, the destination address may be set to a domain configuration group address (DCG).

The DCG may be a value that indicates, to the receiving network element, a command for adding or deleting a value to the FIB of the receiving network element for a certain domain type. In this case, the DCG may be for the domain type of the highest domain type encapsulated in the header and the operation to be performed (e.g., add or delete). Highest domain type encapsulation meaning furthermost from the outermost encapsulation of the packet.

At S480, the third network element broadcasts the ethernet packet in the lowermost domain via the transceiver (e.g., send the ethernet packet to the lowermost domain).

Returning to S440, if the domain is not overlaid on a lower domain, then the process proceeds to S460 and continues as discussed above.

Restated, for example, the third network element 300 may obtain an identifier or address of the third network element 300 (or in some example embodiments a different address such as a virtual local area network (VLAN) identification) in the network 1000 and generate an information packet with an ethernet header including the identifier of the network element in a source slot of the header and a destination address field including a value indicative of a command for modifying a forward information base (FIB) at another network element. The information packet does not include a payload and has an ethertype field in the ethernet header having a value indicating an absence of the payload. The third network element 300 may then send the information packet over the network 1000.

Figure 6:
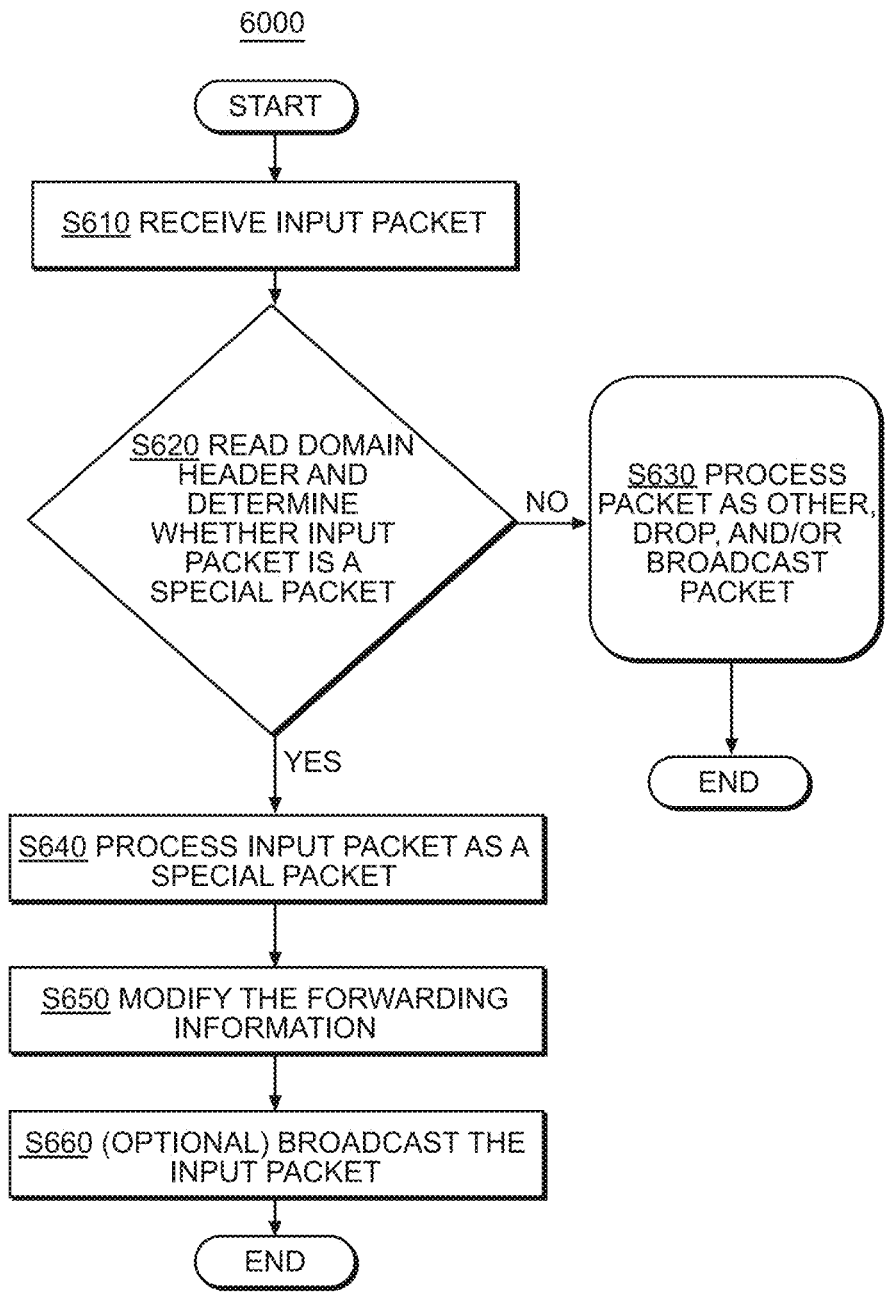
FIG. 6 is a flow chart illustrating a method processing an ethernet packet according to some example embodiments.

FIG. 6 is flow chart 6000 illustrating a method for processing an ethernet packet according to some example embodiments. The operations of the method shown in FIG. 6 will be discussed with regard to a first network element 100 shown in FIG. 1 receiving a special data packet. Although discussed as performed by the first network element 100 in most instances, it should be understood that the operations of the method shown in FIG. 6 may be performed by components (e.g., transceivers, processing circuitry, etc.) of the first network element 100. It should also be understood that example embodiments may be applicable to any of the network elements shown in FIG. 1 and/or different networks having different numbers of layers.

Referring to FIG. 6, at S610, the first network element 100 receives an input packet (information packet).

At S620, the first network element 100 reads a domain header from the input packet and determines whether the input packet is a special packet for the first network element 100. For example, the first network element 100 may determine that the input packet is a special packet if the destination address (e.g., DMAC) includes a DCG for the domain type of the first network element 100 in the network 1000. That is, for example, the first network element 100 may to determine whether the input packet is the special packet based on whether the domain header includes an add command or delete command in a destination slot and if the domain type for the add or delete command matches the domain type of the first network element 100 in the network 1000. The first network element 100 may also determine whether the network element is in a highest level of the network 1000 based on the domain header.

If the input packet is not a special packet, then at S630 the first network element 100 processes the input packet as a non-special (e.g., normal), the input packet may be dropped, or the input packet may be broadcast and/or forwarded in the network 1000 depending on a protocol used by the first network element 100.

Returning to S620, if the input packet is a special packet for the first network element 100, then, at S640 the first network element 100 processes the input packet as a special packet to obtain the necessary information from the special packet. In one example, the first network element 100 may based on the DCG command determine the domain encapsulation from which to extract a first value from the domain header. The first value may be a value indicating the identifier of a domain (in the determined domain encapsulation).

At S650, the first network element 100 modifies the forwarding information in the FIB of the first network element 100 based on the extracted information and the DCG. For example, the forwarding information may be updated to add or delete forwarding information for the specified domain type based on the DCG in the header.

Figure 5:
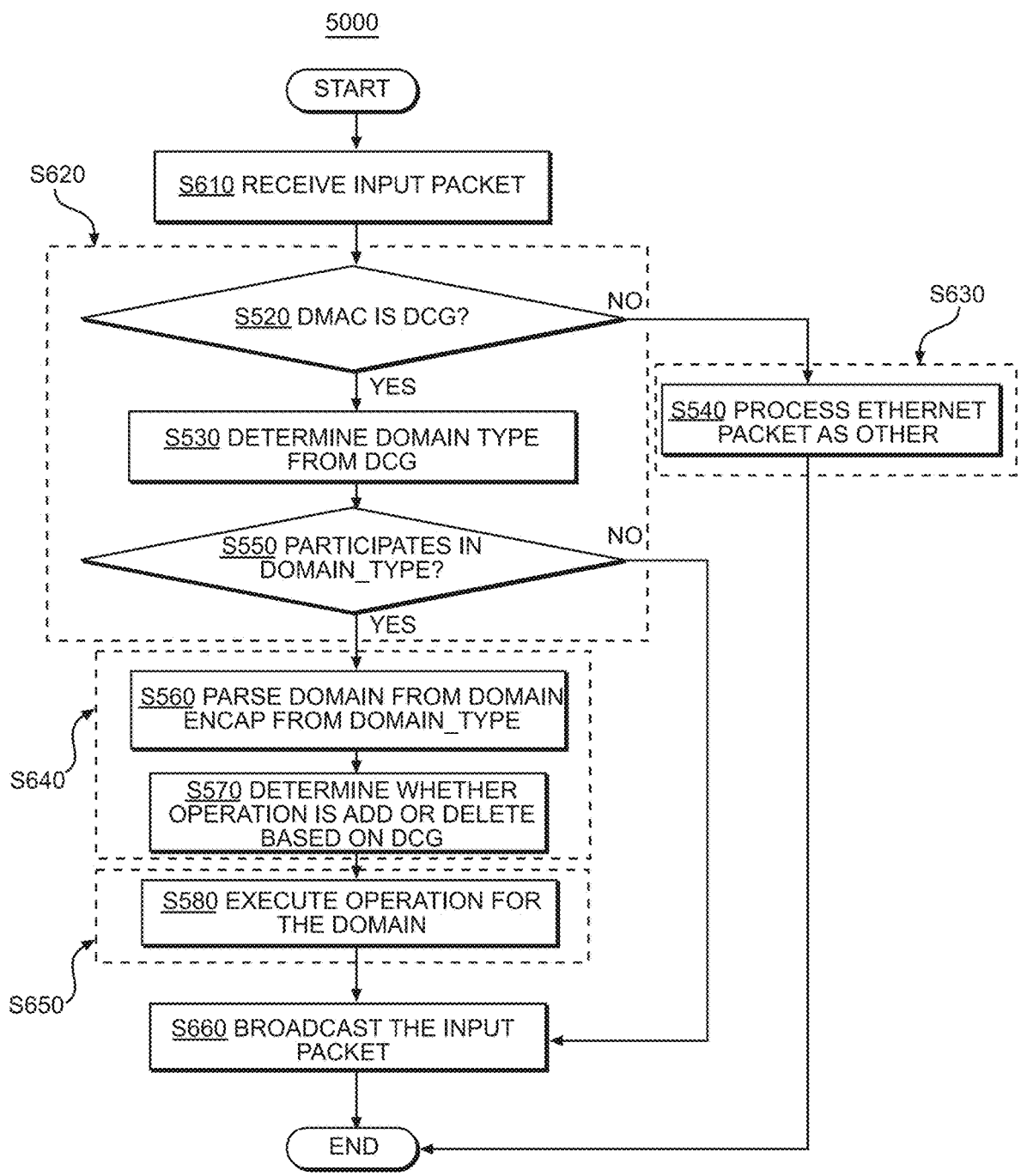
FIG. 5 is a flow chart illustrating a method for processing an ethernet packet according to some example embodiments.

At S660, the first network element 100 broadcasts the input packet to lower levels of the network 1000, or across the highest level of the network 1000. FIG. 5 is a flow chart 5000 illustrating a method for processing an ethernet packet according to some example embodiments. The method of FIG. 5 will be discussed with regard to a first network element 100 receiving the special data packet in a two level network such as a Q-in-Q network. Although discussed as performed by the first network element 100, it should be understood that the operations of the method shown in FIG. 5 may be performed by components (e.g., transceivers, processing circuitry, etc.) of the first network element 100. Moreover, example embodiments discussed herein may be performed by other network elements in FIG. 1. Some operations will be the same as the flow chart 6000. Description of duplicate operations may be omitted.

Referring to FIG. 5, at S610, the first network element 100 receives the input packet (e.g., an ethernet packet or data packet) at the transceiver.

At S520, the first network element 100 determines whether the DMAC is a DCG.

If the first network element 100 determines that the DMAC is not a DCG, then at S630 the first network element 100 processes the ethernet packet as a non-special (e.g., normal) data packet as discussed above with regard to FIG. 6.

At S660, the first network element 100 broadcasts the input packet in the lowermost domain of the header of the input packet using the transceiver.

Returning to S520, if first network element 100 determines that the DMAC is a DCG, then the first network element 100 determines a domain type for the DCG. Each domain type had unique DCG command values accordingly, the domain type may be determined by reading the DCG value and determining the corresponding domain type for that value based on information stored in the memory 140 of the first network element.

At S550, the first network element 100 compares the domain type of the first network element 100 in the network 1000 to the domain type of the DCG to determine whether the first network element 100 participates in the domain type of the DCG. If the first network element 100 does not participate in the domain type of the DCG (e.g., if the first network element is in a first network layer of the network 1000, but the DCG is an add command for a second layer of the network 1000), then the process proceeds to S590 and continues as discussed above.

Returning to S550, if the first network element 100 participates in the domain type of the DCG, then the first network element 100 may continue to S560. In this example, S520, S530, and S550 are more detailed examples of S620 in FIG. 6.

At S560, the first network element 100 parses the header for the domain from the domain encapsulation for the domain type of the DCG.

At S570, the first network element 100, determines whether the DCG is indicative of an add or delete operation. Steps S560 and S570 is a more detailed examples of S640 in FIG. 6.

At S580, the first network element executes the operation indicated by the DCG for a domain type on the FIB of the first network element (e.g., add or delete of domain). Step S580 is a more detailed example of S650 in FIG. 6. The process then continues to S590 and proceeds as discussed above.

Figure 7:
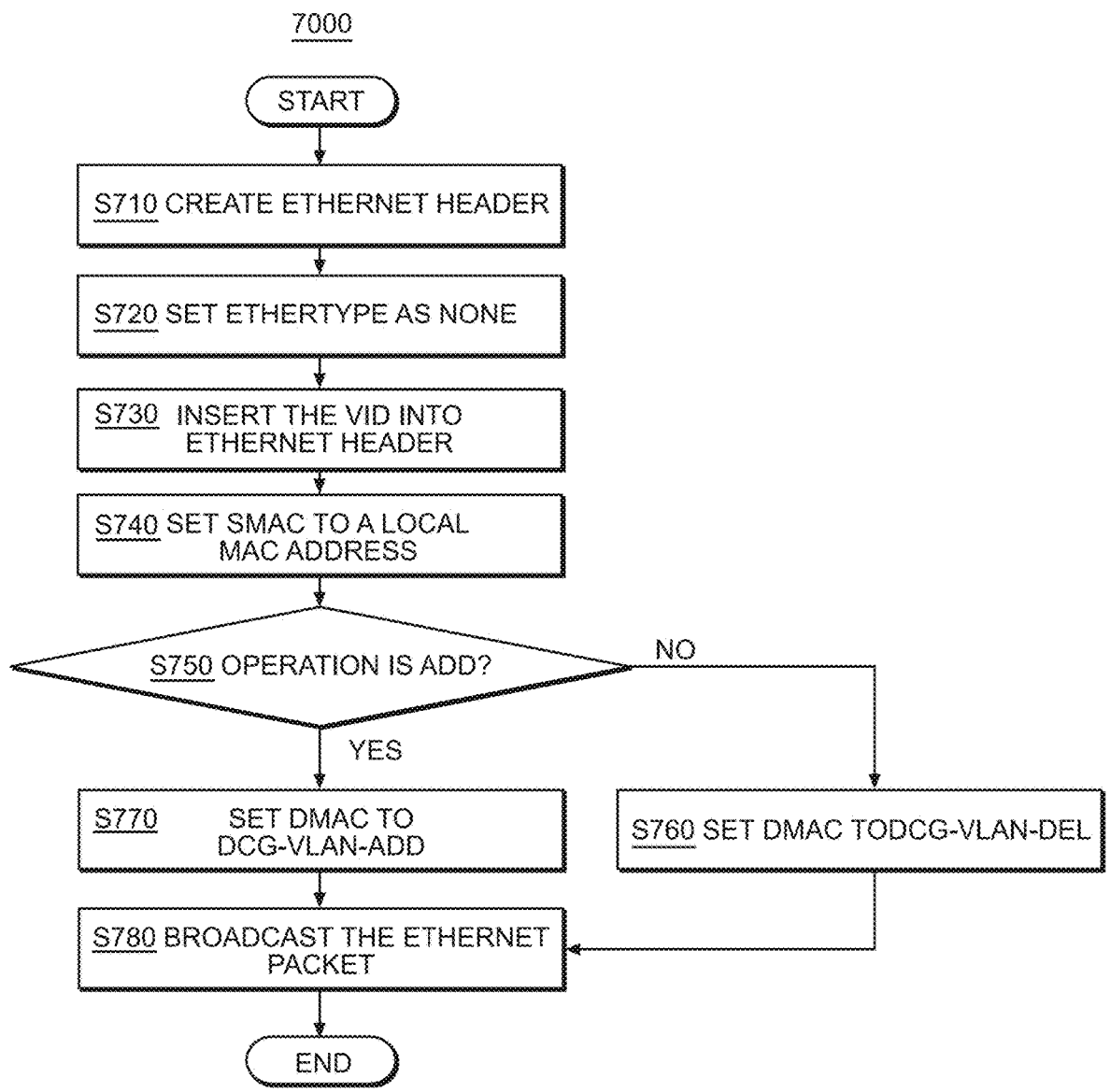
FIG. 7 is a flow chart illustrating a method generating and transmitting an ethernet packet according to some example embodiments.

FIG. 7 is another flow chart 7000 illustrating a method for generating and transmitting an ethernet packet according to some example embodiments. In this example, the method will be discussed with regard to an ethernet packet generated according to the VLAN (or dot1Q) protocol. However, example embodiments should not be limited to this example. Rather, other network elements may perform the method discussed herein. Although discussed as performed by the third network element 300 in most instances, it should be understood that the operations of the method shown in FIG. 7 may be performed by components (e.g., transceivers, processing circuitry, etc.) of the third network element 300.

Referring to FIG. 7, at S710, the third network element 300 creates an ethernet header for sending an ethernet packet over a VLAN.

At S720, the third network element 300 sets an ethertype as none or another value indicating that no payload is included with the ethernet packet.

At S730, the third network element 300 inserts the VLAN identification "VID" of the VLAN into the ethernet header.

At S740, the third network element 300 may set the SMAC as the local MAC address of the third network element 300.

At S750, the third network element 300 determines whether the operation needed at a receiving network element is an add operation ADD in the VLAN. For example, if the third network element 300 is generating the packet to add a VLAN to the FIBs of network elements of the network 1000, an add operation ADD is the needed operation. If the packet is being generated when the third network element 300 is leaving or being reconfigured in the network, then a delete operation DEL is the needed operation. The information needed to determine if an add operation ADD or a delete operation DEL is needed may be received by the third network element through various methods. For example, a user may enter a command to connect to a network which the third network element 300 has never been connected. So the third network element 300 may determine that the an add operation ADD is needed. If the needed operation is not an add operation ADD, then the third network element 300 determines that the needed operation is a delete operation DEL and continues to S760. In some embodiments, the need for a delete operation DEL may be determined independently and not as a result of the needed operation being not being an add operation ADD.

At S760, the third network element sets the DMAC in the ethernet header to a DCG value indicating a command (DCG-VLAN-DEL) to delete the VLAN (e.g., from an FIB at a receiving network element).

At S780, the third network element 300 broadcasts the ethernet packet toward or in the VLAN using the transceiver.

Returning to S750, if the needed operation is an add operation ADD, then the third network element 300 continues to S770.

At S770, the third network element 300 sets DMAC to a value indicating a command (DCG-VLAN-ADD) to add the VLAN to a FIB at a receiving network element. Similar command values may exist for each type of network architecture (e.g., one domain, two domains, etc.). The different DCG values for different domain types informs the receiving network element what type of network device (e.g., network devices of what domain type or in a particular location in a network) is to perform the command and where to obtain the first value that is to be added or deleted. The DCG for a VLAN informs the network device that a VLAN value is to be added or deleted so the receiving network device knows to extract the first value from a VLAN identifier or encapsulation in the header rather than any other domain encapsulation in the header.

At S780, the third network element 300 broadcasts the ethernet packet toward or in the VLAN using the transceiver.

Figure 8:
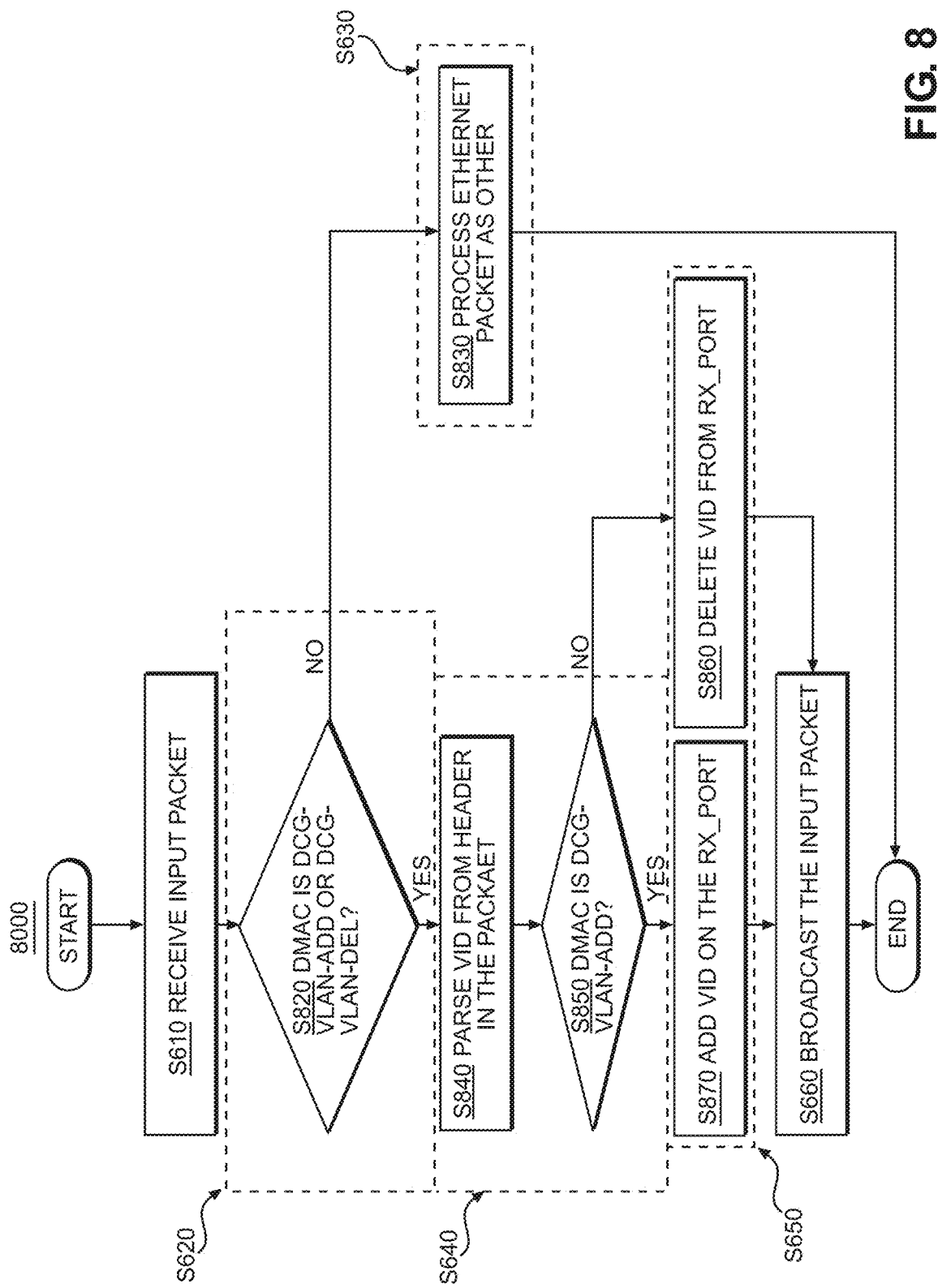
FIG. 8 is a flow chart illustrating a method for processing an ethernet packet according to some example embodiments.

FIG. 8 is another flow chart 8000 illustrating a method for processing an ethernet packet according to some example embodiments. The operations of the flow chart 8000 will be discussed with regard to the first network element 100 However, example embodiments should not be limited to this example. Rather, other network elements may perform the method discussed herein. Moreover, although discussed as performed by the first network element 100 in most instances, it should be understood that the operations of the method shown in FIG. 8 may be performed by components (e.g., transceivers, processing circuitry, etc.) of the first network element 100. Some operations will be the same as the flow chart 6000. Description of duplicate operations may be omitted.

Referring to FIG. 8, at S610, the first network element 100 receives an input packet via the transceiver.

At S820, the first network element 100 determines if the value in the destination slot DMAC is a value indicating a command DCG-VLAN-ADD to add a VLAN or a value indicating a command DCG-VLAN-DEL to delete a VLAN.

If the first network element determines that the DMAC value is not a value indicating a command to add a VLAN or a value indicating a command to delete a VLAN, then the first network element 100 continues to S630 and processes the ethernet packet as a non-special packet.

Returning to S820, if the first network element 100 determines the value in the destination slot DMAC is a value indicating a command to add a VLAN or a value indicating a command to delete a VLAN, then the first network element 100 continues to S840 and parses the VID from the packet header. Step S820 may be a more detailed example of S620 in FIG. 6.

At S850, the first network element 100 determines if the DMAC is a value indicating a command to add an address for the VLAN.

If the DMAC is not a value indicating a command to add an address for the VLAN, then the first network element 100 determines the DMAC is a value indicating a command to delete a VLAN and continues to S860. Step S850 may be a more detailed example of S640 in FIG. 6.

At S860, the first network element 100 deletes the VID of the source device from the FIB for the receiving port Rx_Port (e.g., in the FIB for one of the receivers 112), provided the source device is the only device on the Rx_Port for that VID.

The first network element 100 then broadcasts the input packet to the VLAN or in the VLAN at S660.

Returning to S850, if the first network element 100 determines the DMAC is a value indicating a command to add a VLAN, then the first network element 100 continues to S870.

At S870, the first network element 100 adds the VID of the source device to the FIB of the first network element 100 for the receiving port Rx_Port. Steps S860 and S870 may be a more detailed example of S650 in FIG. 6.

The process then continues to step S660 and proceeds as discussed above.

Figure 9:
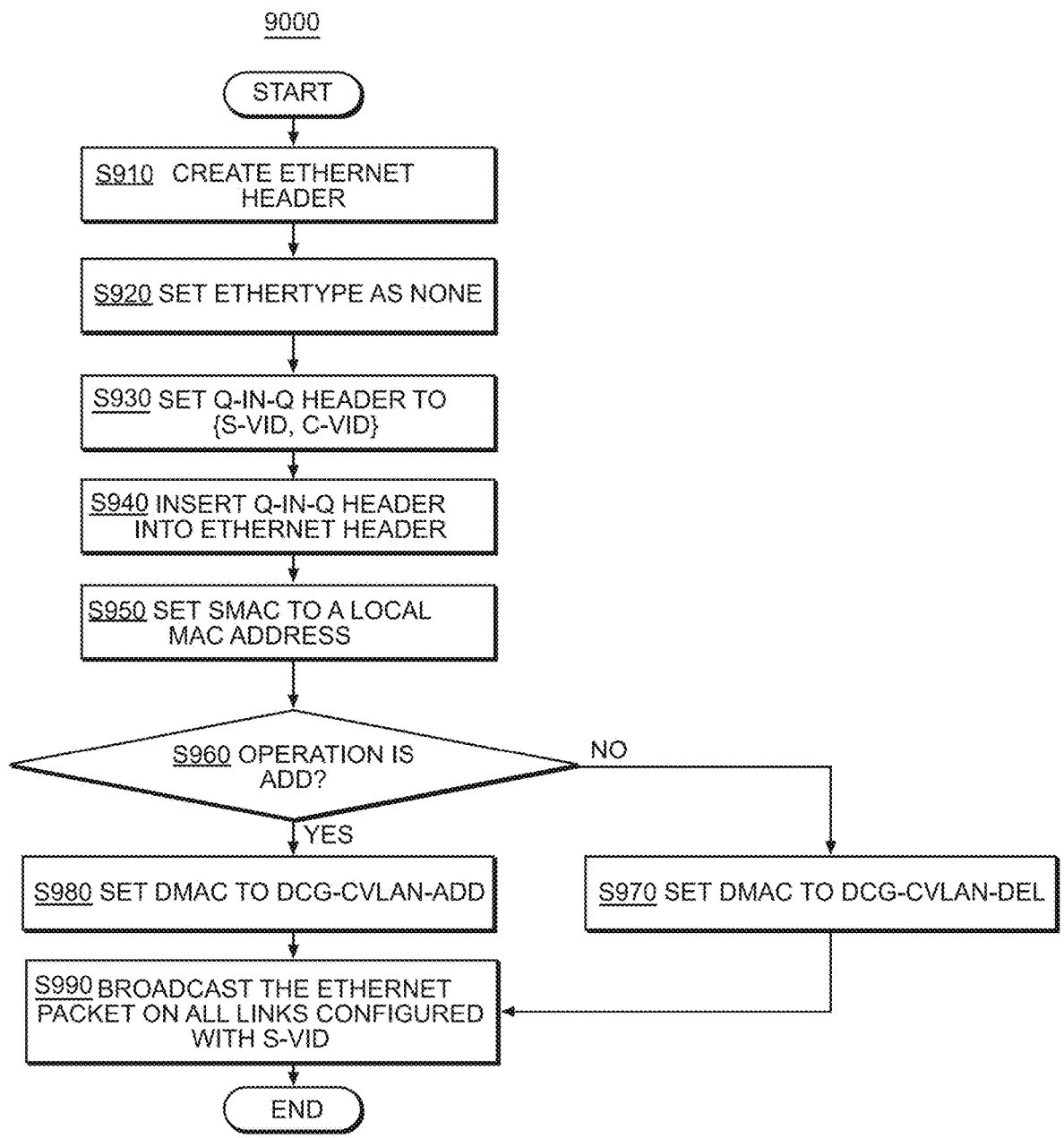
FIG. 9 is a flow chart illustrating method or generating and transmitting an ethernet packet according to some example embodiments.

FIG. 9 is another flow chart 9000 illustrating a method for generating and transmitting an ethernet packet according to some example embodiments. In this example, the method will be discussed with regard to an ethernet packet generated according to the Q-in-Q protocol. The method shown in FIG. 9 will be discussed with regard to the third network element 300. However, example embodiments should not be limited to this example. Rather, other network elements may perform the method discussed herein. Moreover, although discussed as performed by the third network element 300 in most instances, it should be understood that the operations of the method shown in FIG. 9 may be performed by components (e.g., transceivers, processing circuitry, etc.) of the third network element 300.

Referring to FIG. 9, at S910, the third network element 300 creates an ethernet header according to the Q-in-Q protocol.

At S920, the third network element 300 sets an ethertype as none, or another value indicating that no payload is included in the packet.

At S930, the third network element 300 sets the Q-in-Q header to a single provider VID (S-VID) as the VID of the source device (e.g., the third network element 300) and customer VID (C-VID).

At S940, the third network element 300 inserts the Q-in-Q header in the ethernet header.

At S950, the third network element 300 sets the SMAC in the header as a local MAC of the third network element 300.

At S960, the third network element 300 determines whether an add operation command is to be included in the ethernet header. This may be performed in a similar manner as S750 only for a Q-in-Q protocol.

If the third network element 300 determines an add operation command is not to be included in the ethernet header, then the third network element continues to S970. At S970, the third network element 300 sets DMAC in the ethernet header to a value DCG-CVLAN-DEL indicating a command for deleting a customer virtual local area network (CVLAN), wherein the customer virtual local area network identification (CVID) is encoded in the Q-in-Q header in the packet.

At S990, the third network element 300 broadcasts the ethernet packet on all links of the transmission port configured with S-VID using the transceiver of the third network element 300.

Returning to S960, if the third network element 300 determines an add operation command is to be included in the ethernet header, then the third network element 300 continues to S980.

At S980, the third network element 300 sets the DMAC in the ethernet header to a value DCG-CVLAN-ADD indicating a command for adding a CVLAN, wherein the CVID is encoded in the Q-in-Q header in the packet. The process then proceeds to S990 and continues as discussed above.

Figure 10:
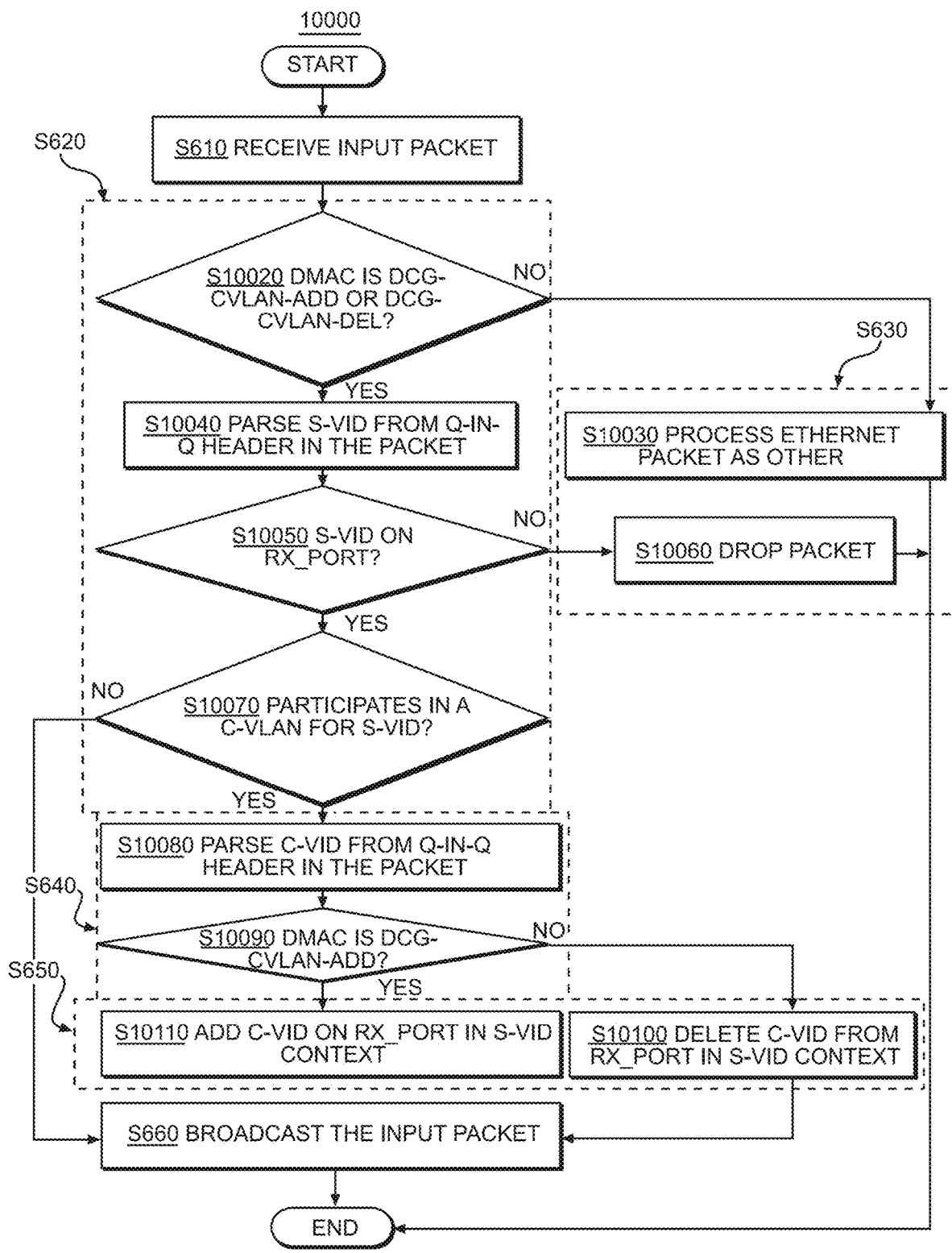
FIG. 10 is a flow chart illustrating a method for processing an ethernet packet according to some example embodiments.

FIG. 10 is a flow chart 10000 illustrating a method for processing an ethernet packet according to some example embodiments. The ethernet packet may be organized according to the Q-in-Q protocol. The method shown in FIG. 10 will be discussed with regard to the first network element 100 receiving an ethernet packet. However, example embodiments should not be limited to this example. Rather, example embodiments may be applicable to other network elements. Moreover, although discussed as performed by the first network element 100 in most instances, it should be understood that the operations of the method shown in FIG. 10 may be performed by components (e.g., transceivers, processing circuitry, etc.) of the first network element 100. Some operations will be the same as the flow chart 6000. Description of duplicate operations may be omitted.

Referring to FIG. 10, at S610, the first network element 100 receives an input packet organized according to the Q-in-Q protocol via the transceiver.

At S10020, the first network element 100 determines if the value in the DMAC of the header is a value indicating a command DCG-CVLAN-ADD for adding a CVLAN to a FIB or a value indicating a command DCG-CVLAN-DEL for deleting a CVLAN from the FIB.

If the first network element 100 determines that the value in the DMAC of the header is not a value indicating a command for adding a CVLAN or a value indicating a command for deleting a CVLAN, then the first network element 100 continues to S10030 and processes the ethernet packet as a non-special packet.

Returning to S10020, if the first network element 100 determines that the value in the DMAC of the header is a value indicating a command for adding a CVLAN or a value indicating a command for deleting a CVLAN s, then the first network element 100 continues to S10040.

At S10040, the first network element 100 parses S-VID from the Q-in-Q header in the packet.

At S10050, the first network element 100 determines whether S-VID is configured in the FIB for the receiving port Rx_Port at the first network element 100. If S-VID is not configured in the FIB for the receiving port Rx_Port, then the first network element 100 continues to S10060 and the packet is dropped. In this example embodiment, S10030 and S10060 may be a more detailed example of S630 in FIG. 6.

Returning to S10050, if S-VID is configured in the FIB for the receiving port Rx_Port, then the first network element 100 continues to S10070.

At S10070, the first network element 100 determines whether the first network element 100 participates in a C-VLAN for the S-VID (determines if C-VLAN in the ethernet header is part of the single provider virtual local area network identification S-VID of the first network element 100). The first network element 100 may determine if it participates in a customer for the S-VID of the first network element 100 based on the S-VID of the first network element 100 and associated consumer VLAN stored in the memory at the first network element 100.

If the first network element 100 does not participate in the C-VLAN for the S-VID, then the first network element 100 continues to S660 and broadcasts the input packet in a S-VID context (e.g., forwards in the network 1000 at the single provider network level).

Returning to S10070, if the first network element 100 does participate in the C-VLAN for the S-VID the first network element 100 continues to S10080. Steps S10020, S10040, S10050, and S10070 may be a more detailed example of S620 in FIG. 6.

At S10080, the first network element 100 parses C-VID from the Q-in-Q header in the ethernet packet.

At S10090, the first network element 100 determines if the DMAC of the header includes a value DCG-CVLAN-ADD indicating a command for adding a CVLAN. If the DMAC of the header does not include a value indicating a command for adding a CVLAN, the first network element 100 proceeds to S10100. At S10100, the first network element 100 deletes C-VID from the header of the ethernet packet from the FIB of the first network element 100.

The process then proceeds to S660 at which the first network element 100 broadcasts the input packet in the S-VID context.

Returning to S10090, if the DMAC of the header includes a value indicating a command for adding a CVLAN, then the first network element 100 continues to S10110. Steps S10080 and S10090 may be a more detailed example of S640 in FIG. 6.

At 10110, the first network element 100 adds C-VID on the receiving port Rx_Port in the S-VID context (e.g., for transmission according to the Q-in-Q protocol in the single provider network layer). In this example, S10100 and S10110 may be a more detailed example of S650 in FIG. 6.

The process then continues to S660, and proceeds as discussed above.

Figure 11:
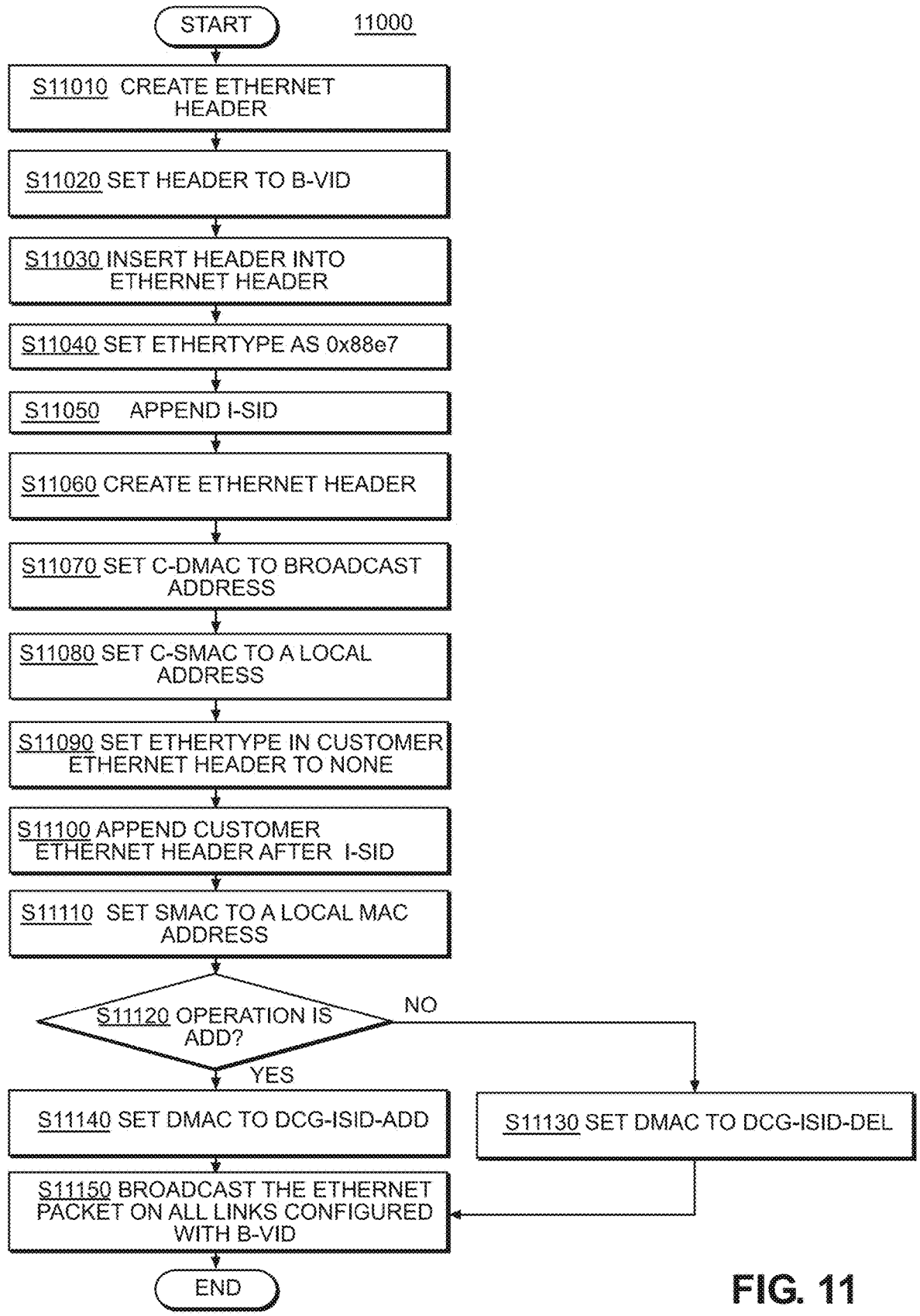
FIG. 11 is a flow chart illustrating a method for generating and transmitting an ethernet packet according to some example embodiments.

FIG. 11 is another flow chart 11000 illustrating a method for generating and transmitting an ethernet packet according to some example embodiments. The method shown in FIG. 11 will be discussed with regard to an ethernet packet generated according to a provider backbone bridging (PBB) protocol and with regard to the third network element 300. However, example embodiments However, example embodiments should not be limited to this example. Rather, other network elements may perform the method discussed herein. Moreover, although discussed as performed by the third network element 300 in most instances, it should be understood that the operations of the method shown in FIG. 11 may be performed by components (e.g., transceivers, processing circuitry, etc.) of the third network element 300.

Referring to FIG. 11, at S11010, the third network element 300 creates an ethernet packet with a primary ethernet header.

At S11020, the third network element 300 creates and sets a backbone-VID (B-VID) header.

At S11030, the third network element 300 appends the B-VID header into the primary ethernet header.

At S11040, the third network element 300 sets an ethertype as, for example, 0x88e7 or other value indicating that an I-service instance identifier (I-SID) is the next value. The I-SID is defined and used to associate a given customer ethernet frame with a provider service instance.

At S11050, the third network element 300 appends the primary ethernet header with an I-SID.

At S11060, the third network element 300 creates an empty customer ethernet header.

At S11070, the third network element 300 sets the customer DMAC (C-DMAC) as a broadcast address in the customer ethernet header.

At S11080, the third network element 300 sets the customer SMAC (C-SMAC) as a local customer domain value in the customer ethernet header. If no local customer domain value is known, then a value of zero may be used.

At S11090, the third network element 300 sets an ethertype of the customer ethernet header to none or another value indicating no payload is included.

At S11100 the third network element 300 appends the customer ethernet header to the primary ethernet header after the I-SID. The network hierarchy domain encapsulations 630 of the ethernet packet may come from the B-VID header, I-SID and customer ethernet header. Destination address field 640 and the source address field 650 may come from the primary header. Restated, appending the primary header with B-VID header, I-SID and customer ethernet header adds the network hierarchy domain encapsulation to the ethernet packet.

At S11110, the third network element 300 may set the SMAC to a local MAC address that uniquely identifies the third network element 300.

At S11120, the third network element 300 determines whether the needed operation is to add the I-SID. This may be performed in a similar manner as S750 but for a PBB protocol. If the needed operation is not to add the I-SID, then the third network element 300 may continue to S11130.

At 11130, the third network element 300 sets the DMAC of the primary ethernet header to a value DCG-ISID-DEL indicating a command to delete the I-SID and proceed to S11150.

At S11150, the third network element 300 broadcasts the ethernet packet on all links of the transmitting port configured with the B-VID.

Returning to S11120, if the needed operation is to add the I-SID, then the third network element 300 continues to S11140.

At S11140, the third network element 300 sets the DMAC of the primary ethernet header to a value DCG-ISID-ADD indicating a command to add the I-SID.

At S11150, the third network element 300 broadcasts the ethernet packet on links of the transmitting port configured with the B-VID.

Figure 12:
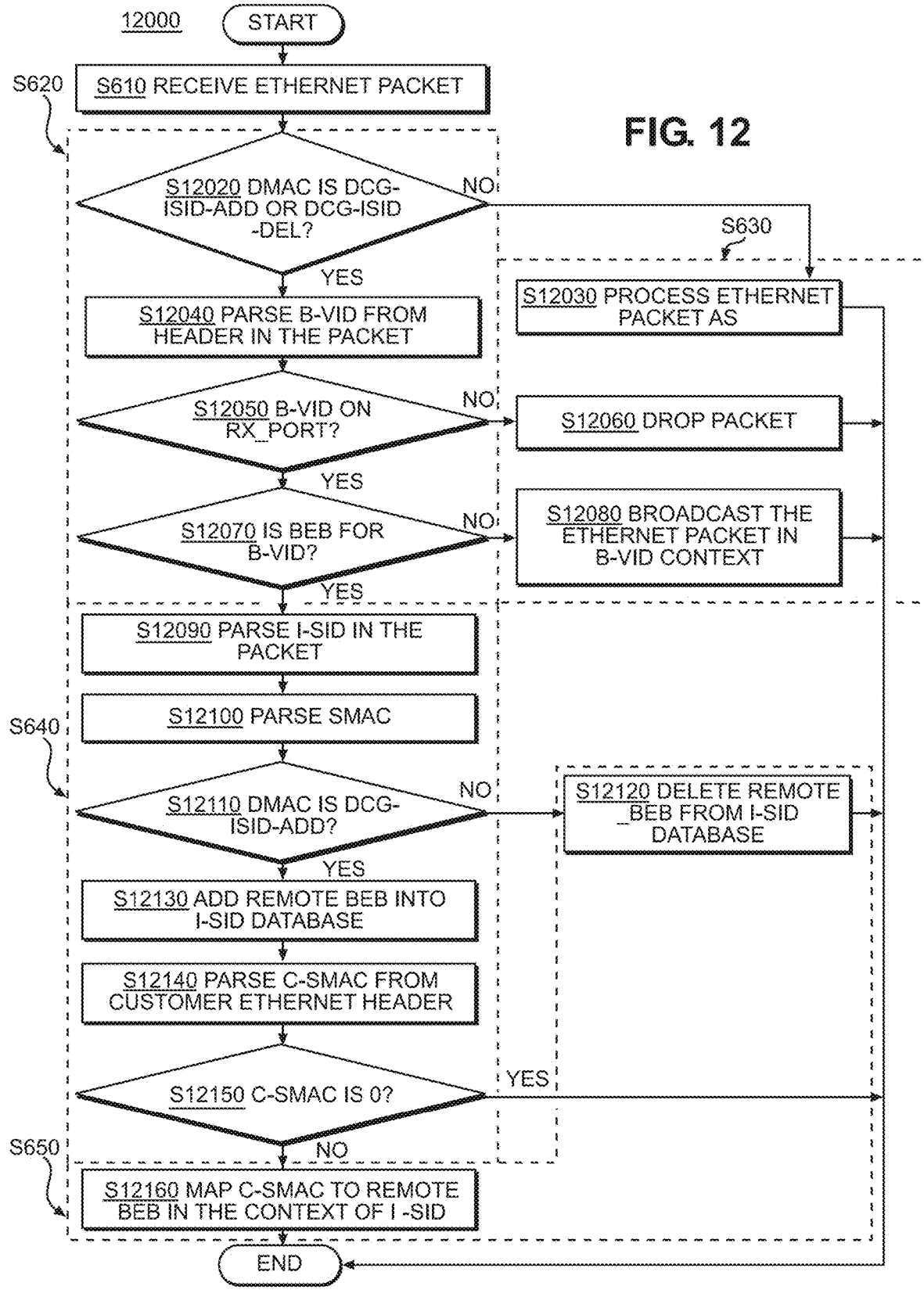
FIG. 12 is a flow chart illustrating a method for processing an ethernet packet according to some example embodiments.

FIG. 12 is another flow chart 12000 illustrating a method for processing an ethernet packet according to some example embodiments. The ethernet packet may be organized according to a PBB protocol. The method shown in FIG. 12 will be discussed with regard to the first network element 100. However, example embodiments should not be limited by this example. Although discussed as performed by the first network element 100 in most instances, it should be understood that the operations of the method shown in FIG. 5 may be performed by components (e.g., transceivers, processing circuitry, etc.) of the first network element 100. Some operations will be the same as the flow chart 6000. Description of duplicate operations may be omitted.

Referring to FIG. 12, at S610, the first network element 100 receives an input packet using the transceiver.

At S12020, the first network element determines whether the DMAC of the ethernet packet is a value DCG-ISID-ADD indicating to add I-SID or a value DCG-ISID-DEL indicating to delete I-SID. If the DMAC of the ethernet packet is not a value indicating to add I-SID or a value indicating to delete I-SID, then the first network element 100 proceeds to S12030. At S12030, the first network element processes the ethernet packet as a non-special packet as discussed above.

Returning to S12020, if the DMAC of the ethernet packet is a value indicating to add I-SID or a value indicating to delete I-SID, then the first network element proceeds to S12040.

At S12040, the first network element 100 parses B-VID from the header in the ethernet packet.

At S12050, the first network element 100 determines if B-VID is configured in the FIB for the receiving port Rx_Port for the first network element 100. If the B-VID is not configured in the FIB for the receiving port Rx_Port, then the first network element 100 continues to S12060 and drops the ethernet packet.

Returning to S12050, if B-VID is configured in the FIB for the receiving port Rx_Port, then the first network element 100 continues to S12070.

At S12070, the first network element 100, determines whether the first network element is a backbone edge bridge (BEB) for the B-VID. The first network element 100 may store information, in the memory 140, whether it is a BEB in the network 1000 and for what B-VID the first network element 100 is a BEB. If the first network element 100 is not a BEB for the B-VID, then the first network element 100 continues to S12080.

At S12080, the first network element broadcasts the Ethernet packet in a B-VID context (e.g., toward BEBs for the B-VID). In this example, S1230, S12060, and S12080 may be a more detailed example of S630 in FIG. 6.

Returning to S12070, if the first is a BEB for the B-VID, then the first network element 100 continues to S12090. In this example, S12020, S12040, S12050, and 12070 may be a more detailed example of S620 in FIG. 6.

At S12090, the first network element 100 parses I-SID from the header in the packet.

At S12100, the first network element 100 parses SMAC from the header of the packet which identified the remote BEB that originated the I-SID configuration packet.

At S12110, the first network element 100 determines whether the DMAC in the header is a value indicating a command DCG-ISID-ADD for adding and I-SID. If the DMAC in the header is not a value indicating a command from adding and I-SID, then the first network element 100 continues to S12120. At S12120, the first network element 100 deletes the I-SID in the context of the remote BEB address or indicator from the I-SID database in the FIB. The remote BEB address is the SMAC from the header of the packet.

Returning to 12110, if the DMAC in the header is a value indicating a command from adding a I-SID, then the first network element 100 continues to S12130.

At S12130, the first network element adds the I-SID in the context of the remote BEB address or indicator in the FIB.

At S12140, the first network element 100 parses the C-SMAC from the customer ethernet header.

At S12150, the first network element 100 determines if C-SMAC is zero or another value indicating no local customer domain value is known. If C-SMAC is zero (or another value indicating no local customer domain value is known), then the first network element 100 ends the process.

If C-SMAC is not zero (or another value indicating no local customer domain value is known), then the first network element 100 proceeds to S12160. In this example, S12090, S12100, S12110, S12130, S12140, and S12150 may be a more detailed example of S640 in FIG. 6.

At S12160, the first network element 100 maps C-SMAC to Remote BEB in the context of I-SID in the FIB. In this example, S12120 and S12160 may be a more detailed example of S650 in FIG. 6.

Figure 13:
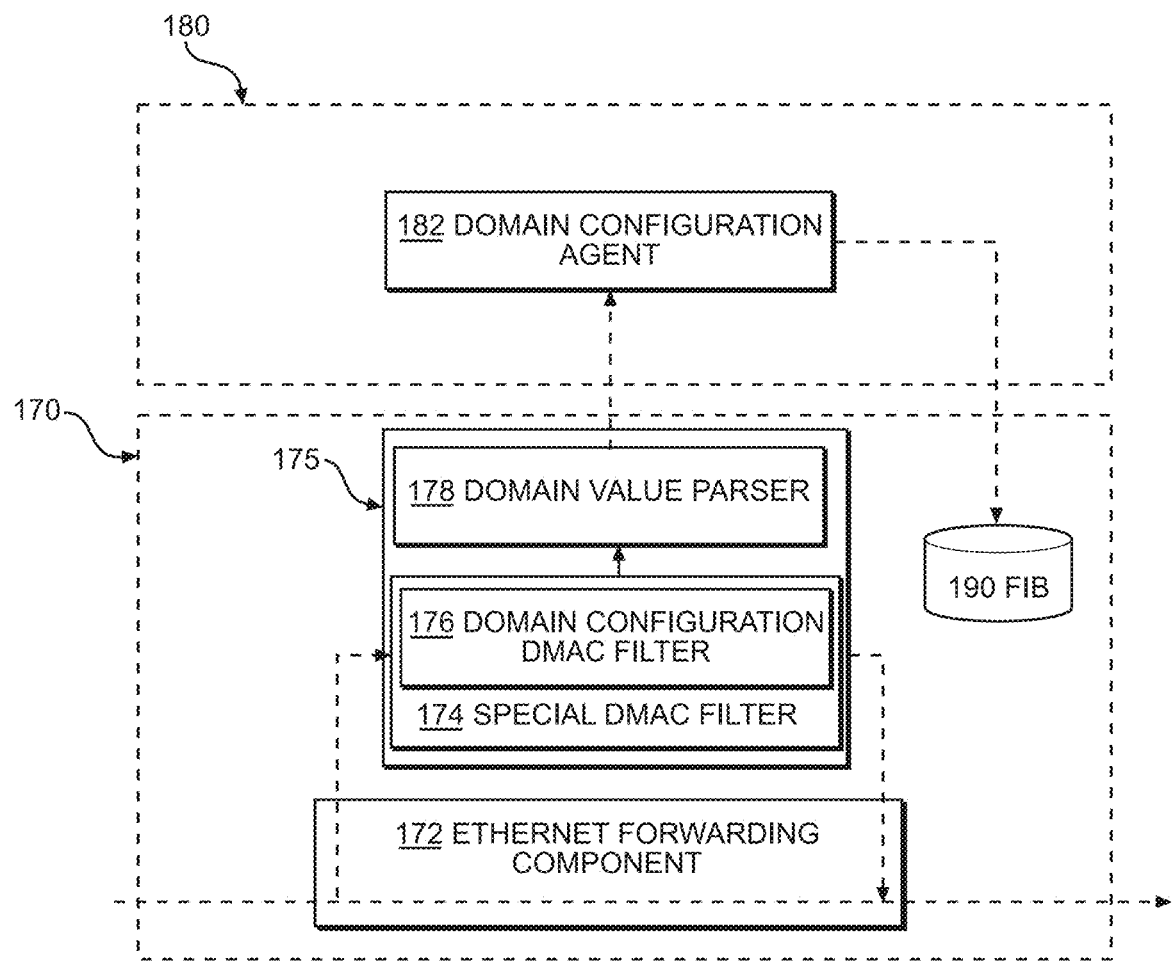
FIG. 13 is a block diagram illustrating control plane and data plane operations for a network element processing an ethernet packet according to some example embodiments.

FIG. 13 is a block diagram illustrating control plane 180 and data plane 170 operations for the network element processing the ethernet packet according to some example embodiments. The data plane 170 and control plane 180 elements may be implemented by the processing circuitry of one of the network elements, for example the first network element 100.

Referring to FIG. 13, in the data plane 170 an ethernet forwarding component 172 may receive ethernet packets and forward or broadcast the ethernet packets in the network 1000.

The control plane 180 may include a header processing agent 175 which reads and parses portions of the header of the ethernet packets. The header processing agent 175 may include a special DMAC filter 174 configured to determine if the header is for a special ethernet packet by determining if the DMAC includes a DCG for adding or deleting a value from the FIB 190.

The special DMAC filter 174 may include a domain configuration DMAC filter 176 configured to determine whether an add or delete command is in the DMAC, and if the add or delete command matches the network configuration of the network element (e.g., is the command consistent with the placement of the network element in the network 1000 such that the network element should implement the command). For example, the determinations in S10050 or S12070 may be made in the domain configuration DMAC filter 176. The header processing agent 175 may also include a domain value parser 178, which parses a domain value from one of the domain encapsulations of the header that are values to be added or deleted values from the FIB.

In the control plane 180, a domain configuration agent 182 may be included that determines the action (add, delete, nothing) to be taken based on the information parsed from the header. The domain configuration agent 182 may implement the actions in the FIB 190 or elsewhere as necessary. The FIB 190 may be stored in a memory and may be considered as part of the data plane 170 because the FIB is used with the ethernet forwarding component 172 to know where to forward ethernet packets.

The burden on the control plane of the network element may be smaller (e.g., significantly smaller) than in other conventional methods because no payload needs to be read, parsed, or interpreted. The information the domain configuration agent 182 needs to know in order to execute the needed actions can all be sent in the header with the special configuration and DCG described above.

Existing network elements may be updated to perform methods according to one or more example embodiments. The update may be implemented as a firmware update that provides programming for processing the DCGs for adding and deleting network domains in the FIB. If the network element includes an FPGA these changes may be made with a firmware update without removing hardware. Other network elements with ASICs which cannot be reprogrammed with a firmware update may need to have components replaced to implement the methods described above.

In one example, this lower control plane usage may be useful for advanced driver assistance systems functions for automated or autonomous driving. The bridges (network elements) in an automotive ethernet network are low power (battery driven) devices, but equipped with a relatively high bandwidth ethernet data plane for low latency, real-time communication of bursty traffic. End devices are segregated into functional groups and each group is assigned an independent VLAN. To conserve power, end devices on the network are dynamically powered on/off based on their use which requires VLAN segments in the network to be dynamically configured.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures, and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), SmartNICs, Adaptive compute acceleration platform (ACAP) or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network element to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other accelerator, or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A network element comprising:
   processing circuitry configured to cause the network element to
   determine whether a received information packet is a special packet based on whether a domain header of the received information packet includes a domain configuration group (DCG) address for a domain type of the network element in a destination address field of the domain header, the DCG address being indicative of an add command or a delete command,
   extract an identifier of a network domain from the domain header of the received information packet in response to determining that the received information packet is the special packet, and
   modify a forwarding information base at the network element based on the DCG address and the identifier of the network domain.

2. The network element of claim 1, wherein the processing circuitry is configured to cause the network element to extract the identifier of the network domain from a domain encapsulation of the domain header of the received information packet.

3. The network element of claim 1, wherein the processing circuitry is configured to cause the network element to forward the received information packet in a network.

4. The network element of claim 1, wherein
   the domain header is an ethernet header including a payload field,
   the payload field does not include a payload in the payload field, and
   the received information packet includes an ethertype field in the ethernet header, the ethertype field indicating absence of the payload.

5. The network element of claim 1, wherein the processing circuitry is configured to cause the network element to drop the received information packet in response to determining that the received information packet is not a special packet.

6. The network element of claim 1, wherein the processing circuitry is configured to cause the network element to broadcast the received information packet in response to determining that the received information packet is not a special packet.

7. The network element of claim 1, wherein the processing circuitry is configured to cause the network element to delete the identifier of the network domain from the forwarding information base at the network element in response to the DCG address being indicative of the delete command.

8. The network element of claim 1, wherein
the received information packet is received from a source device, and
the identifier of the network domain is an address of a virtual local area network (VLAN) of the source device.

9. The network element of claim 8, wherein the processing circuitry is configured to cause the network element to delete the address of the VLAN from the forwarding information base for a receiving port of the network element in response to the DCG address being indicative of the delete command.

10. A method comprising:
determining, at a network element, whether a received information packet is a special packet based on whether a domain header of the received information packet includes a domain configuration group (DCG) address for a domain type of the network element in a destination address field of the domain header, the DCG address being indicative of an add command or a delete command;
extracting an identifier of a network domain from the domain header of the received information packet in response to determining that the received information packet is the special packet; and
modifying a forwarding information base at the network element based on the DCG address and the identifier of the network domain.

11. The method of claim 10, wherein the extracting extracts the identifier of the network domain from a domain encapsulation of the domain header of the received information packet.

12. The method of claim 10, further comprising:
forwarding the received information packet in a network.

13. The method of claim 10, further comprising:
dropping the received information packet in response to determining that the received information packet is not a special packet.

14. The method of claim 10, further comprising:
broadcasting, by the network element, the received information packet in response to determining that the received information packet is not a special packet.

15. The method of claim 10, further comprising:
deleting, by the network element, the identifier of the network domain from the forwarding information base at the network element in response to the DCG address being indicative of the delete command.

16. The method of claim 10, wherein
the received information packet is received from a source device, and
the identifier of the network domain is an address of a virtual local area network (VLAN) of the source device.

17. The method of claim 16, further comprising:
deleting, by the network element, the address of the VLAN from the forwarding information base for a receiving port of the network element in response to the DCG address being indicative of the delete command.

18. A network element comprising:
processing circuitry configured to cause the network element to
obtain an identifier of the network element of a network,
generate an information packet with a header having a destination address field and a domain encapsulation, the destination address field including a domain configuration group (DCG) address for a domain type of the network element, the domain encapsulation including an identifier of a network domain, the DCG address being indicative of an add command or a delete command for modifying a forwarding information base at another network element based on the DCG address, and
send the information packet over the network.

* * * * *